United States Patent
Hua et al.

(10) Patent No.: US 9,483,283 B1
(45) Date of Patent: Nov. 1, 2016

(54) ENHANCED CODE CALLBACK

(71) Applicant: Apptimize, Inc., Menlo Park, CA (US)

(72) Inventors: Nancy Hua, Mountain View, CA (US); James Brandon Koppel, Cambridge, MA (US); Jeremy Nelson Orlow, Palo Alto, CA (US)

(73) Assignee: Apptimize, Inc., Menlo Park, CA (US)

( * ) Notice: Subject to any disclaimer, the term of this patent is extended or adjusted under 35 U.S.C. 154(b) by 0 days.

(21) Appl. No.: 14/945,938

(22) Filed: Nov. 19, 2015

Related U.S. Application Data

(60) Provisional application No. 62/082,262, filed on Nov. 20, 2014.

(51) Int. Cl.
*G06F 3/00* (2006.01)
*G06F 9/445* (2006.01)
*G06F 9/54* (2006.01)

(52) U.S. Cl.
CPC .............. *G06F 9/44505* (2013.01); *G06F 8/67* (2013.01); *G06F 9/542* (2013.01)

(58) Field of Classification Search
CPC ....................................................... G06F 9/542
USPC ........................................................ 719/328
See application file for complete search history.

(56) References Cited

U.S. PATENT DOCUMENTS

| | | | |
|---|---|---|---|
| 7,620,953 B1* | 11/2009 | Tene | G06F 9/5077 709/203 |
| 2003/0014521 A1* | 1/2003 | Elson | G06F 9/5011 709/225 |
| 2005/0044201 A1* | 2/2005 | Suzuki | H04L 29/06 709/223 |
| 2007/0113291 A1* | 5/2007 | Dai | G06F 21/629 726/27 |
| 2014/0040921 A1* | 2/2014 | Li | G06F 9/54 719/320 |
| 2014/0380282 A1* | 12/2014 | Ravindranath Sivalingam | G06F 11/3476 717/128 |
| 2015/0160931 A1 | 6/2015 | Glazer et al. | |

OTHER PUBLICATIONS

Koen Victor,Application Platforms for embedded systems: Suitability of J2ME and.Net Compact Framework, 2006.*

\* cited by examiner

*Primary Examiner* — Lechi Truong

(57) ABSTRACT

Implementations are disclosed herein for enhancing swizzling technology. In at least one implementation, functions are hooked by modifying their machine code implementations to jump to a central callback function. The central callback function may then route to other target functions that serve to replace the hooked functions. In another implementation, the machine code implementations are modified to jump to intermediate functions. The intermediate functions invoke dispatch functions that can call into a central callback function. The central callback function may return to the hooked functions.

17 Claims, 7 Drawing Sheets

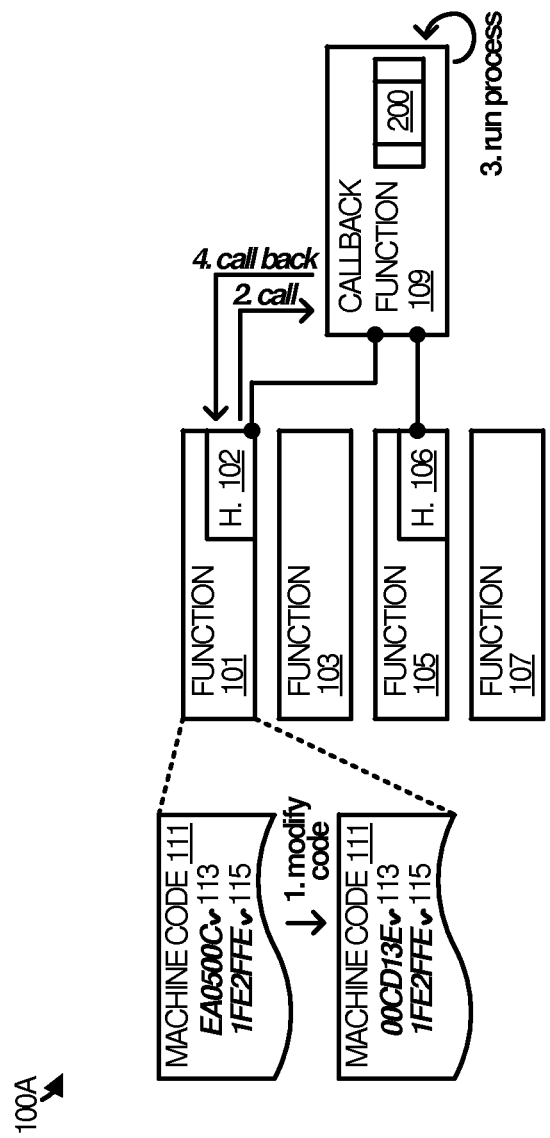

ENHANCED CODE CALLBACK

RELATED APPLICATIONS

This application claims the benefit of and priority to U.S. Patent Application No. 62/082,262, filed on Nov. 20, 2014, and entitled "Enhanced Swizzling," and which is hereby incorporated by reference in its entirety.

TECHNICAL FIELD

Aspects of the disclosure are related to computing hardware and software technology, and in particular, to enhanced code callback technology.

TECHNICAL BACKGROUND

In the fields of computer hardware and software technology, it is possible in various runtime environments to modify how a method, function, class, or other such software component maps to the actual code implementation of the component. Sometimes referred to as swizzling, such re-mapping technology allows code associated with one function to be replaced by code associated with another function. This may be useful in the context of making modifications to a user interface, for example.

Some implementations of re-mapping technology involve modifying the value of a pointer that points to a location in memory where a method is implemented in code. By changing the value of the pointer, the method can be made to point to other code such that, when the method is called, a different method is employed in its place. The target method that is called in place of the original method is sometimes referred to as a callback function.

In order to swizzle multiple functions, multiple callback functions are typically created that each correspond to one of the multiple functions, which allows the callback functions to call back into the original functions with little difficulty. For instance, one original function may be remapped to jump to one callback function, while another original function may be remapped to jump to another, different call back function, and so on for the remainder of the original and callback functions as they correspond to each other.

Code optimization technology employed in some runtime environments can make code re-mapping difficult, if not impossible. For example, one runtime environment reduces the prominence of the v-table, or dispatch table, which reduces the effectiveness of remapping via pointer modifications. Pointers are still used to a certain extent, but de-virtualization and other optimization techniques that speed-up the execution of code make finding and remapping them more difficult.

OVERVIEW

Provided herein are systems, methods, and software that enhance code hooking and callbacks by way of a central, or single callback function to which any of multiple original functions may jump. In at least one implementation, machine code that is representative of the multiple original functions is modified to jump into a single callback function when any of the multiple original functions are invoked.

In addition, the single callback function identifies which target function of various target functions to call into in response to the original function jumping to the callback function and calling the target function. When the target function returns to the callback function, the callback function employs technology to identify which original function of the multiple original functions jumped to the callback function to begin with, so that the callback function can return to the original function.

In another implementation, the machine code implementation of an original function is modified to jump into an intermediate function. The intermediate function calls a dispatcher function that calls into a central callback function. The central callback function is able to return to the original function.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIGS. 1A-C illustrate various operational architectures and associated scenarios in several implementation of enhanced swizzling.

TECHNICAL DISCLOSURE

Figure 1B:
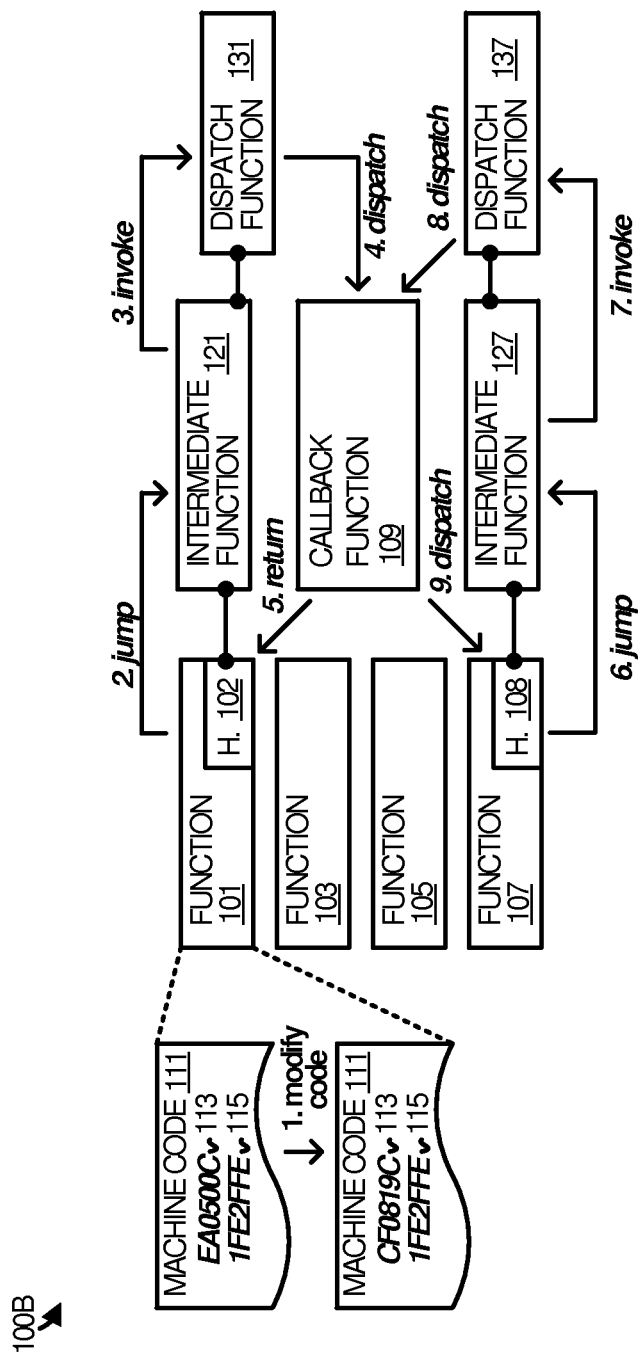

Implementations are disclosed herein for enhancing swizzling technology. In at least one implementation, functions are hooked by modifying their machine code implementations to jump to a central callback function. The central callback function may then route to other target functions that serve to replace the hooked functions. In another implementation, the machine code implementations are modified to jump to intermediate functions. The intermediate functions invoke dispatch functions that can call into a central callback function. The central callback function may return to the hooked functions.

In both implementations, arguments associated with the hooked functions are identified and retained in memory, allowing the central callback function to return to the original, hooked functions with ease, if so desired.

FIG. 1A illustrates a callback architecture 100A for implementing enhanced code callbacks. FIG. 1A also illustrates a representative operational scenario to demonstrate various aspects of enhanced code callbacks.

Callback architecture 100A includes function 101, function 103, function 105, and function 107. Functions 101, 103, 105 and 107 are representative of any methods, functions, classes, or other such software components that may be subject to modification at runtime. Callback architecture 100A also includes callback function 109, which is representative of any other function to which a modified (or swizzled) function can jump.

In operation, a software routine (not pictured) modifies machine code associated with a designated component so that the component, rather than executing its own code, jumps to the code for another function. In this manner, the other function can be executed in place of the original function. In this scenario, it is function 101 and function 105 that are modified. After being modified, function 101 includes hook 102, which represents that function 101 is hooked into callback function 109. Function 105 also includes a hook 106 to represent that function 105 is hooked into callback function 109.

Hooks 102 and 106 are implemented by modifying the machine code implementation of functions 101 and 102. Machine code 111 is representative of a machine code implementation of function 101. Machine code 111 includes a first portion 113 and a second portion 115. A limited amount of machine code is illustrated merely for exemplary purposes and more code would normally be present. It may also be appreciated that the format and content of machine code 111 is provided merely for illustrative purposes and could also vary. It may also be appreciated that the terms "first" and "second" with respect to the portions of machine code 111 are used merely to distinguish the portions from each other, not to denote order. For example, other code may precede the first portion 113 of machine code 113; other code may exist in-between first portion 113 and second portion 115; and other code may follow second portion 115.

The first portion 113 of machine code 111 initially reads EA0500C, whereas the second portion 115 of machine code 111 initially reads 1FE2FFE. The aforementioned software routine searches for machine code 111 in memory and, upon locating it, overwrites the first portion 113 with new code. The new code in the first portion 113 of machine code 111 reads 00CD13E, merely to represent that the content of the first portion 113 was overwritten with new information. It may be appreciated that the same or a similar modification may be made to the machine code associated with function 105. Many techniques for hooking code are possible and may be considered within the scope of the present disclosure.

When function 101 is called in operation and machine code 111 is encountered, the new value in the first portion 113 of machine code 111 causes a programmatic jump to callback function 109 (via its own machine code implementation). When callback function 109 is called, it runs callback process 200, which is illustrated in more detail in FIG. 2. Referring parenthetically to the steps illustrated in FIG. 2, when code jumps into callback function 109, callback function 109 identifies the source of the call or jump (step 201). An identity of the source of the call may be stored in memory for later reference. The source of the call may be identified by name, by associated variable, arguments, or parameters, or in a variety of other ways. Many techniques for identifying the source of a call are possible and may be considered within the scope of the present disclosure.

For example, each function that is hooked will have different numbers of and types of arguments that are stored in different locations in memory. When callback function 109 is invoked via a hooked function, it identifies how many and what kinds of arguments are associated with the hooked function and where they are located in memory. Callback function 109 then captures the arguments. In some implementations, such logic may be implemented in callback function 109 or in some other code that is separate from callback function 109 and that may execute prior to callback function 109.

Callback function 109 then runs any process or subprocess that may be relevant to the context of its operation (step 203). In some scenarios, callback function 109 calls one or more other functions to run in-place of function 101. In other scenarios, callback function 109 is the only function to run in-place of function 101. The arguments and parameters that are identified earlier may in some cases be passed on to another function or functions that run in place of function 101, although in other cases they are not.

When callback function 109 completes, it identifies a path back to the source of the call that invoked callback function 109 to begin with (step 205). This may be accomplished by referring to the name, variables, arguments, parameters, or other information previously stored in memory when callback function 109 was initially called. Many techniques for identifying a return path are possible and may be considered within the scope of the present disclosure. Calling back to the original function is optional. In some scenarios, callback function 109 may call back into the original function before completing its own routine(s), while in other scenarios it may call back into the original function multiple times, or not at all.

Having identified a path back to the source of the call, callback function 101 calls back into the source (step 207), which in this scenario is function 101. The callback is made in such a way that function 101 or the overall program, routine, or application that it is a part of, can continue to run normally.

FIG. 1B illustrates a callback architecture 100B for implementing enhanced code callbacks. FIG. 1B also illustrates a representative operational scenario to demonstrate various aspects of enhanced code callbacks.

Callback architecture 100B includes many of the same elements as callback architecture 100A, with the addition of intermediate function 121, intermediate function 127, dispatch function 131, and dispatch function 137. Functions 101, 103, 105 and 107 are representative of any methods, functions, classes, or other such software components that may be subject to modification at runtime. Intermediate functions 121 and 127 are representative of any methods, functions, classes, or other such software components to which to which a modified (or swizzled) function can jump.

In operation, a software routine (not pictured) modifies machine code associated with a designated component so that the component, rather than executing its own code, jumps to the code for another function. In this manner, the other function can be executed in place of the original function. In this scenario, it is function 101 and function 107 that are modified. After being modified, function 101 includes hook 102, which represents that function 101 is hooked into intermediate function 121. Function 107 also includes a hook 108 to represent that function 107 is hooked into intermediate function 127.

Hooks 102 and 108 are implemented by modifying the machine code implementation of functions 101 and 107. In this scenario, the first portion 113 of machine code 111 initially reads EA0500C, whereas the second portion 115 of machine code 111 initially reads 1FE2FFE. The aforementioned software routine searches for machine code 111 in memory and, upon locating it, overwrites the first portion 113 with new code. The new code in the first portion 113 of machine code 111 reads CF0819C, merely to represent that the content of the first portion 113 was overwritten with new information. It may be appreciated that the same or a similar modification may be made to the machine code associated with function 105. As mentioned many techniques for hooking code are possible and may be considered within the scope of the present disclosure.

When function 101 is called in operation and machine code 111 is encountered, the new value in the first portion 113 of machine code 111 causes a programmatic jump to intermediate function 121 (via its own machine code implementation). When intermediate function 121 is called, it invokes dispatch function 131. Dispatch function 131 may then callback function 109. When callback function 109 executes, it may run its own routines or call yet other functions. Callback function 109 may also return to function 101.

Similarly, were function 107 to be executed, its machine code implementation would jump to intermediate function 127. Intermediate function 127 would invoke dispatch function 137, which in turn would call callback function 109. If desired, callback function 109 could then return operations to function 107. This chain of calls allows the arguments and parameters associated with function 107 to be passed to callback function 109 seamlessly, which allows callback function 109 to return to function 107, if desired.

Figure 1C:
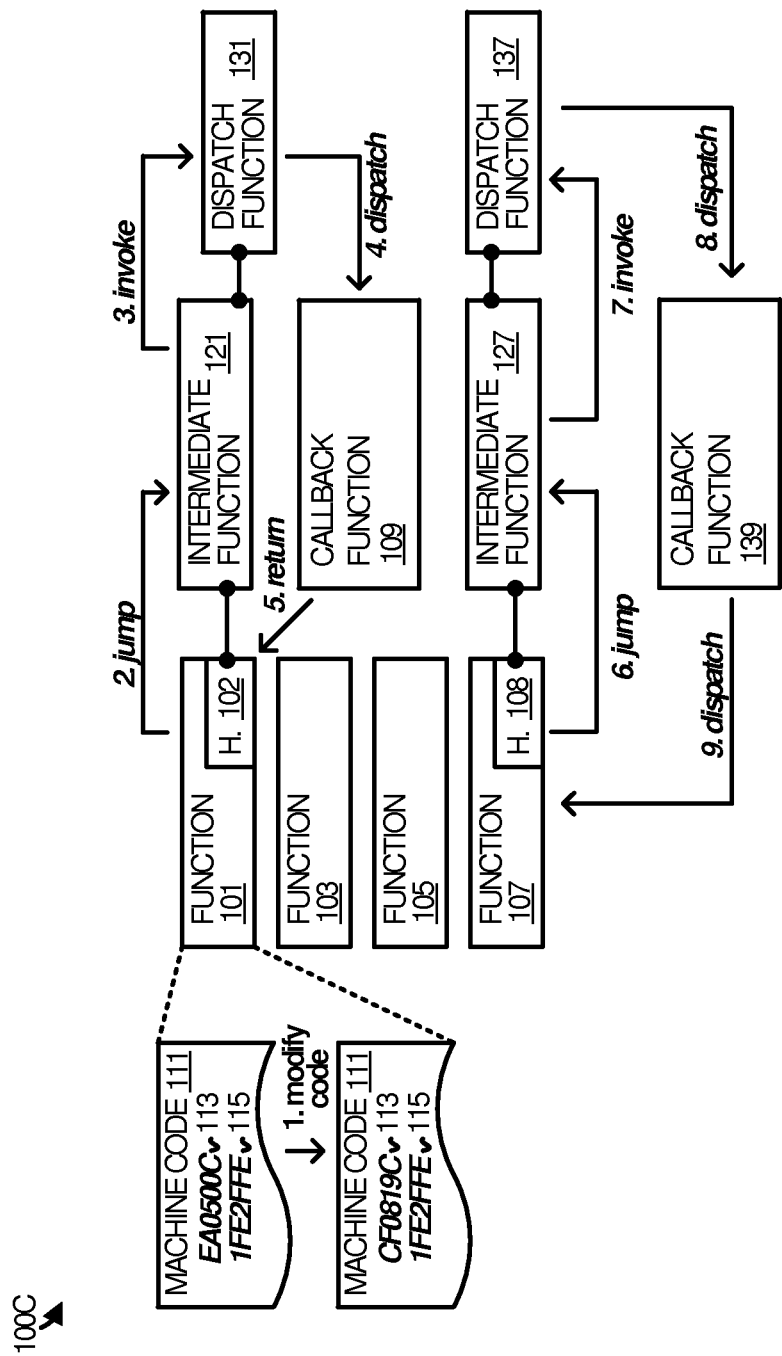

FIG. 1C illustrates a callback architecture 100C for implementing enhanced code callbacks. FIG. 1C also illustrates a representative operational scenario to demonstrate various aspects of enhanced code callbacks.

Callback architecture 100C includes many of the same elements as callback architecture 100B, with the addition of callback function 139.

In operation, a software routine (not pictured) modifies machine code associated with a designated component so that the component, rather than executing its own code, jumps to the code for another function. In this manner, the other function can be executed in place of the original function. In this scenario, it is function 101 and function 107 that are modified. After being modified, function 101 includes hook 102, which represents that function 101 is hooked into intermediate function 121. Function 107 also includes a hook 108 to represent that function 107 is hooked into intermediate function 127.

Hooks 102 and 108 are implemented by modifying the machine code implementation of functions 101 and 107. In this scenario, the first portion 113 of machine code 111 initially reads EA0500C, whereas the second portion 115 of machine code 111 initially reads 1FE2FFE. The aforementioned software routine searches for machine code 111 in memory and, upon locating it, overwrites the first portion 113 with new code. The new code in the first portion 113 of machine code 111 reads CF0819C, merely to represent that the content of the first portion 113 was overwritten with new information. It may be appreciated that the same or a similar modification may be made to the machine code associated with function 105. As mentioned many techniques for hooking code are possible and may be considered within the scope of the present disclosure.

When function 101 is called in operation and machine code 111 is encountered, the new value in the first portion 113 of machine code 111 causes a programmatic jump to intermediate function 121 (via its own machine code implementation). When intermediate function 121 is called, it invokes dispatch function 131. Dispatch function 131 may then callback function 109. When callback function 109 executes, it may run its own routines or call yet other functions. Callback function 109 may also return to function 101.

Similarly, were function 107 to be executed, its machine code implementation would jump to intermediate function 127. Intermediate function 127 would invoke dispatch function 137, which in turn would call callback function 139. If desired, callback function 139 could then return operations to function 107. This chain of calls allows the arguments and parameters associated with function 107 to be passed to callback function 139 seamlessly, which allows callback function 139 to return to function 107, if desired.

The following is an example scenario that may be implemented by an architecture similar to callback architecture 100B and callback architecture 100C. In operation, Java Native Interface (JNI) hijacking may be utilized to enhance swizzling. A function may be hooked by overwriting its machine code to jump to a JNI stub (intermediate function). The JNI stub takes the arguments/parameters for the hooked function via an ArtMethod invoked as an argument. The JNI looks up and invokes a C++ function (dispatch function) that corresponds an argument pattern associated with the hooked function. The C++ function can dispatch to a CallHandler function (central callback function) in order to invoke the original, hooked function using the arguments/parameters associated with the hooked function.

Figure 3:
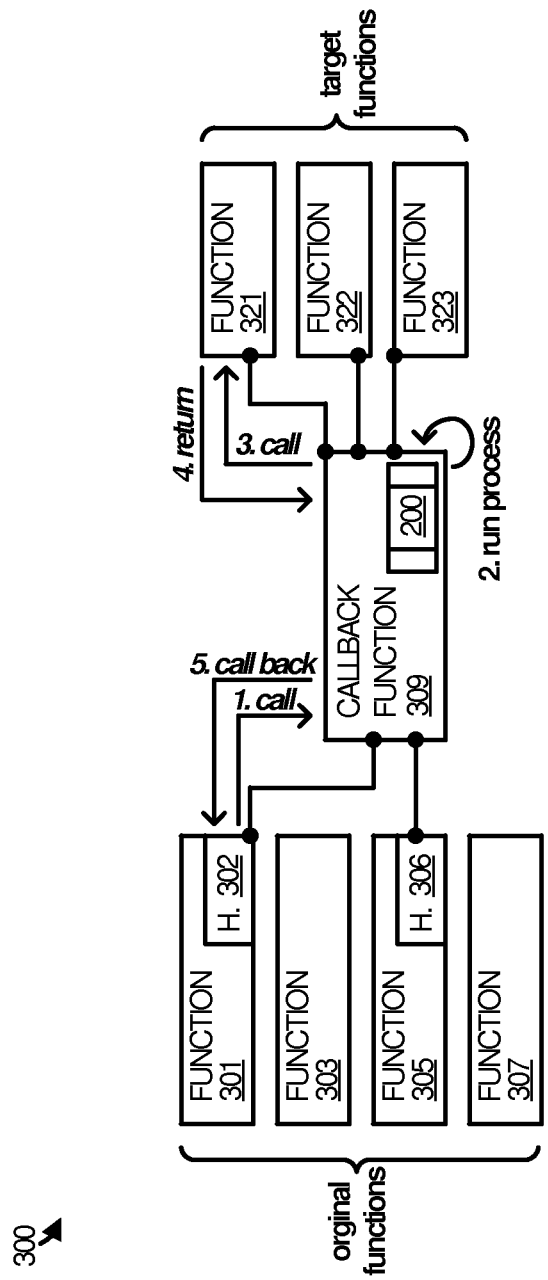
FIG. 3 illustrates an operational architecture and an associated scenario in an implementation.

FIG. 3 illustrates another callback architecture 300 and operational scenario in an implementation. Callback architecture 300 includes function 301, function 303, function 305, and function 307. Functions 301, 303, 305, and 307 are representative of any functions, methods, classes, or other software components that may serve as original functions to be hooked in any manner to call into or jump to callback function 309. In this scenario, function 301 and function 305 have been modified as such (represented by hooks 302 and 306 respectively), whereas function 303 and function 307 are not hooked.

Callback architecture 300 also includes various target functions that callback function 309 can call or "route" to when it is jumped to by a hooked function. The target functions are represented by function 321, function 322, and function 323. Functions 321, 322, and 323 are representative of any function, method, class, or other such software component that a developer may desire to run in-place of an original function. In other words, the target functions are not callback functions with respect to hooked functions, even though they are the functions that run in-place of original functions. Rather, callback function 409 performs a centralized callback role and services as a single callback function to which multiple original functions can jump and to which multiple target functions can return. However, the target functions may be considered callback functions with respect to a callback function that calls them, such as callback function 309.

In operation, function 301 is encountered during the operation of another program, application, or other software routine. Hook 302 prompts a call into callback function 309 so that some other code can be run in place of the machine code implementation of function 101.

Figure 2:
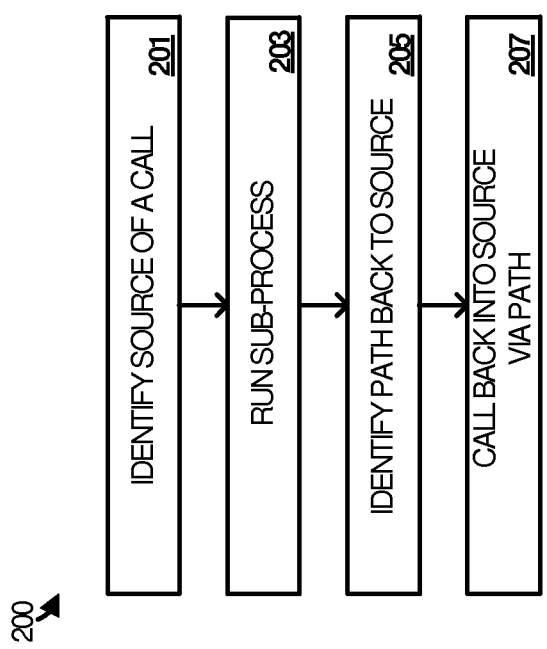
FIG. 2 illustrates a callback process in an implementation.

When callback function 309 is called, it runs callback process 200, referred to previously with respect to FIG. 1 and FIG. 2. When code jumps into callback function 309, callback function 309 identifies the source of the call or jump. An identity of the source of the call may be stored in memory for later reference. The source of the call may be identified by name, by associated variable, arguments, or parameters, or in a variety of other ways. Callback function 309 then determines which target function or functions to call. In this example, function 321 is called to run in-place of function 301.

When function 321 completes, control returns to callback function 309. Callback function 309 identifies a path or mechanism back to function 301, which may include accessing the name, arguments, parameters, or other associated information that was previously stored in memory. Callback function 309 calls back into function 301 so that function 301 and its associated program can continue to run normally.

Figure 4:
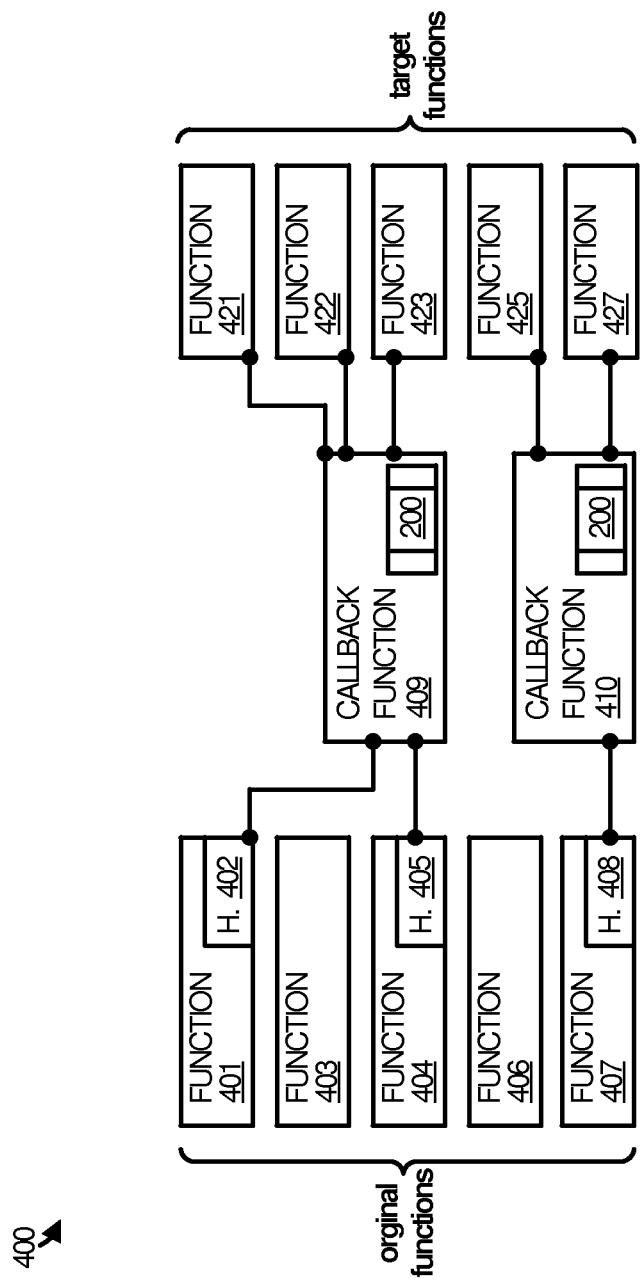
FIG. 4 illustrates an operational architecture in an implementation.

FIG. 4 illustrates callback architecture 400 in an implementation to demonstrate how enhanced callback architectures can vary. Callback architecture 400 includes original functions represented by function 401, function 403, function 404, function 406 and function 407.

In a departure, callback architecture 400 includes multiple callback functions, represented by callback function 409 and callback function 410. Function 401 hooks into callback function 409 via hook 402 and function 404 hooks into callback function 410 via hook 405. Other callback functions are possible and may be considered within the scope of the present disclosure. Callback function 409 routes to various target functions, represented by function 421, function 422, and function 423. Callback function 410 routes to various other target functions, represented by function 425 and function 427.

Various technical effects may be appreciated from the foregoing disclosure. Hooking functions by modifying their machine code to jump into a callback function or functions makes it possible to run other functions in their place. This provides a technical advantage when previous techniques are not possible or are difficult. In addition, a single, centralized callback function makes managing the jumps and callbacks associated with machine-code level implementations feasible.

Other technical effects include the ability to hook functions to an intermediate function. This provides a mechanism for cleanly passing the arguments for a hooked function to a callback function via a dispatcher function. In addition, some techniques contemplated herein, such as JNI stub hijacking, leverages the system/environment being modified to generate an intermediate function or functions.

Overall, the enhanced callback technology disclosed herein allows code substitution to proceed in runtime environments that are less hospitable to code substitution than in the past.

Figure 5:
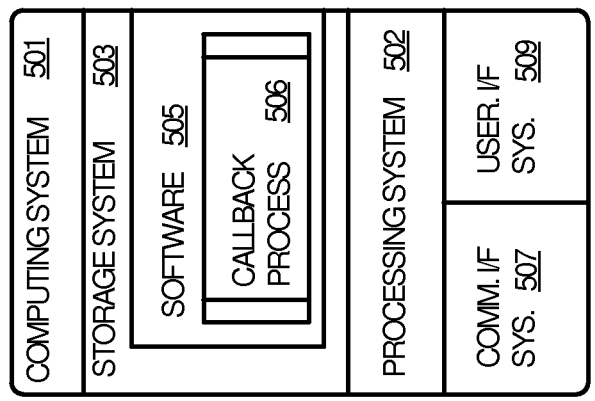
FIG. 5 illustrates a computing system suitable for implementing any of the architectures, components, applications, services, processes, and operational scenarios disclosed herein with respect to FIGS. 1-4 and discussed below in the Technical Disclosure.

FIG. 5 illustrates computing system 501 that is representative of any system or collection of systems in which the various operational architectures, scenarios, and processes disclosed herein may be implemented. Examples of computing system 501 include, but are not limited to, smart phones, laptop computers, tablet computers, desktop computers, hybrid computers, gaming machines, virtual machines, smart televisions, smart watches and other wearable devices, as well as any variation or combination thereof. In other examples, other types of computers may be involved in the processes, including server computers, rack servers, web servers, cloud computing platforms, and data center equipment, as well as any other type of physical or virtual server machine, and any variation or combination thereof.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 509. Processing system 502 is operatively coupled with storage system 503, communication interface system 507, and user interface system 509.

Processing system 502 loads and executes software 505 from storage system 503. Software 505 includes at least callback process 506, which is representative of the callback processes discussed with respect to the preceding FIGS. 1-4, including callback process 200 and the processes embodied in operational scenarios discussed herein. When executed by processing system 502 to enhance callback operations, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and other circuitry that retrieves and executes software 505 from storage system 503. Processing system 502 may be implemented within a single processing device, but may also be distributed across multiple processing devices or sub-systems that cooperate in executing program instructions. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for implementing enhanced callback operations and related functionality.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software or other application software, in addition to or that include callback process 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to facilitate enhanced callback operations. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

It may be understood that computing system 501 is generally intended to represent a computing system or systems on which software 505 may be deployed and executed in order to implement enhanced callback operations. However, computing system 501 may also be suitable as any computing system on which software 505 may be staged and from where it may be distributed, transported, downloaded, or otherwise provided to yet another computing system for deployment and execution, or yet additional distribution.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 509 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 509. In some cases, the input and output devices may be combined in a single device, such as a display capable of displaying images and receiving touch gestures. The aforementioned user input and output devices are well known in the art and need not be discussed at length here.

User interface system 509 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The following is a discussion of various techniques that may be employed to accomplish enhanced swizzling, as well as other related concepts and techniques. Android Runtime (ART) is an application runtime environment used by the Android operating system. ART replaces Dalvik, which is the process virtual machine originally used by Android, and performs transformation of the application's bytecode into native instructions that are later executed by the device's runtime environment.

The ART support code discussed herein is based on the fundamental idea of overwriting the machine language code for a function to call into other code, as was previously implemented in the Mobile Substrate library. However, Mobile Substrate is built for code output by a typical compiler. ART outputs what it refers to as "managed code," which follows a number of assumptions that the straightforward approach of mobile substrate breaks. The following summarizes the additional issues that are faced to implement swizzling for Java code on Android compiled with ART, and technical solutions to them.

Swizzling is used to customize software on the device. These customizations are called "Tweaks" and are available through the Cydia store on iOS and through "Xposed" on Android, for example.

Many Methods, One Callback, Unusual Calling Convention.

Mobile Substrate assumes that, for every function hooked, a different callback is provided for it to jump to. It is proposed herein for the support code to have calls to all hooked functions be handled by only one or a few callbacks, to reduce effort and reduce risk. Each function hooked has different numbers and types of arguments, stored in different locations (a mix of the stack and registers). One callback is utilized to figure out how many and what kinds of arguments there are, where they are, and then capture them.

The first argument to every method is a reference to a data structure called the "ArtMethod," which contains metadata about the method. The ArtMethod data structure is used to look-up a data item which ART refers to as the "shorty," which contains a brief summary of the number and types of arguments passed to the method. The stack is traversed to find arguments in the correct locations, using the va_list interface provided by C for accessing the stack directly. Arguments declared in normal and floating-point registers are accessed by declaring arguments appropriately.

The calling convention used by the main mode of ART differs from the standard, so there is additional work to do to compute where stack arguments are stored, as many memory locations will contain undefined values (garbage).

In case ART changes its calling convention to not provide the ArtMethod as the first argument, techniques can be used that are similar to those used to compile closures. For each hooked function, a new piece of assembly is generated which moves a value (either a pointer to the ArtMethod, or some data structure which contains the necessary information) into some location, and then jumps into a common callback. This allows the equivalent of having a distinct callback for every hooked function, but without most of the complexities needed to generate the full callback.

ART also has a deduplication ("de-dupe") feature, where, if two methods compile to the same code, it will reuse the same code at the same address for both. Thus, if one is hooked, both will inadvertently be hooked. Thus, the code needs to distinguish which was actually called. If the method is an instance method rather than a static method, the code can still tell which by looking at the type of the receiver object (the "this" reference). This may still confuse identical methods on the same object, which should be a rare and benign case. In that case, using information described in the "Special stack frame" section, the code can still distinguish them by examining the stack, getting the dex-pc of the caller, and looking at the corresponding bytecode.

The location the code moves the value into would need to not contain important information, and could not be used by another thread. The likely candidates are either an unused register, or an address in the thread-local storage which contains an unchanging value (the value would need to be restored after the call). The current implementation of ART always keep a reference to thread-local storage in one of the registers.

Calling Original Function/Special Code Location.

Because the support code is using the same callback for many different functions, to call the original function, how arguments are passed cannot be hard coded. However, the ART runtime offers the "ArtMethod::Invoke" method for correctly calling any method, no matter how they accept arguments. The following algorithm can be used to call the original code, which is similar to how we call the original code for Dalvik.

First, the support code creates a copy of the ArtMethod object for the hooked method. The code sets the "entryPointFromCompiledCode" field to point to the "origCode" item returned by an assembly-hooking routine. Recall that "origCode" is a copy of the first few bytes of the original code of the method (which was replaced), followed by a jump to the remainder of the original code. Next, the "ArtMethod::Invoke" method is used to correctly invoke the original code.

However, this may not always work because ART assumes that, immediately before the address pointed to by "entryPointFromCompiledCode," there is the "QuickMethodFrameInfo" data structure containing some metadata about the compiled code, such as the code size (number of bytes in the compiled code). ART may later look for this data structure, and, finding garbage, will crash. Thus, the support code cannot simply copy that data structure, as ART, when constructing stack traces, assumes that all code (PCs) for the method is between "entryPointFromCompiledCode" and "entryPointFromCompiledCode+codeSize."

There are two proposed solutions to this problem. Instead of using ArtMethod::Invoke, invoke origCode directly using the same technique used by ArtMethod::Invoke. This involves setting up the stack frame and registers to match ART's assumptions. Alternatively, ART keeps the Java bytecode around, and also has an interpreter. The support code can instead invoke the interpreter on the original method. This does not have major performance implications, as it will jump back into compiled code whenever it makes a method call.

Special Stack Frame.

Every compiled ART method has a fixed-size stack frame with certain values stored in certain places. In particular, the bottom of the stack frame contains a reference to the ArtMethod object. This enables it to lookup the stack frame size and find the previous stack frame. It uses this information to construct stack traces.

At certain points, ART-generated code will write the location of the bottom stack frame to a certain location in thread-local storage, so that it can generate stack traces. During most of execution, in particular during calls to hooked functions, that value will be out-of-date garbage (i.e. undefined), and thus ART will not be able to construct a valid stack trace (and likely will segfault).

However, the "sp" register points to the bottom of the previous stack frame when a hooked function is called. Thus, at the beginning of our callback function, before any normal prologue code runs, we use handcrafted assembly code to write this value into that location in thread-local storage.

That offset in thread-local storage may not be the same between versions, so, to avoid having to generate new code to get this to work on different devices, at application startup, the support code uses some heuristics to find that offset, and then write it to a special location so that our assembly can look it up.

In the discussion above, the value of the "sp" stack-pointer register needed to be known before the body of the function is entered, and so it was assumed special assembly code would be needed to run before calling the function. Normally, the compiler would emit code that would decrement sp before any of the code within the function itself is executed. However, there is no good way to know how much it decremented sp by, and so there is no good way to know its previous value. While this value would be constant, it could change every time the code is recompiled, meaning that hardcoding it into the program would be extremely risky.

However, code compiled for ARM would use the "APCS" calling convention. In APCS, one of the registers would be reserved as the "frame pointer," or "fp", and would point to a special location considered the "beginning" of the stack frame. The previous value of sp would be equal to "fp+4".

Although APCS is only one option, the compiler could be forced to use it by using the "-marm-mapcs-frame" flags. The support code could then access the frame pointer using "_builtin_frame_address(0)", and compute the previous value of sp appropriately. Thus, no special assembly code is needed.

Inlined Code.

Sometimes as an optimization, the compiler will replace a function call with the code from the function's definition. However, it also outputs some metadata indicating it has done so. It also keeps around the original Java bytecode, which tells us that it is conceptually calling that method, and there is the "mapping table" metadata informing us which lines of machine code correspond to which lines of Java bytecode. This mapping data can be used to overwrite the assembly at every single in-lining site.

Too Small.

Typically, 8 bytes is needed to overwrite a function; some functions are only 4 bytes. However, the metadata expresses the code size. Thus, a function's size can be looked up and the support code can avoid hooking ones which are too small.

Multiple Compiler Modes.

ART has multiple compiler modes. Any function can ship with bytecode (executed by the interpreter), "portable compiled code," and/or "quick compiled code." The latter two are both generated assembly code, but with different calling conventions. A function can have all three, and any of them may be run.

For the compiled code, the support code hooks both using the mechanisms described above (but see the "Trampolines and Bridges" section below).

For the interpreted code: the support code replaces the "entryPointFromInterpreter" with the "interpreterToCompiledCodeBridge". Hence, when the interpreter tries to run the method, it will instead invoke the code pointed to the "entryPointFromQuickCompiledCode" or the "entryPointFromPortableCompiledCode" fields. If compiled code exists, then, since the code has already hooked the compiled code, this works. Else, the code sets the entryPointFromCompiledCode fields to point directly to the callback. Since the interpreterToCompiledCodeBridge sets up the environment to properly call compiled code, and the callback is designed to work with that environment, this works.

There are a couple of other options for hooking the interpreter. One is to do the same thing as is done for Dalvik: set the "native" flag on the method, and then provide a value for the "native function" field. However, ART assumes that native methods have a different entryPointFromInterpreter, and will do unusual things here. The other is to set the entryPointFromInterpreter directly to a new callback; however, doing so is complicated, and requires interfacing with a lot of parts of the ART runtime that may change between versions and devices.

Trampolines and Bridges.

The "entryPointFromQuickCompiledCode" and "entryPointFromPortableCompiledCode" may not actually point directly to the compiled code. They may instead point to a trampoline or bridge.

Example trampoline: If you invoke a static method on a class that has not yet been initialized, its entryPointFrom*CompiledCode will point to a "trampoline function" which initializes the class, and then calls the actual method code. It also changes the entryPointFromCompiledCode to be the actual code of the method, so that this does not have to be repeated next time.

Example bridge: If a method has code produced by the "quick compiler" but not by the "portable compiler", then its entryPointFromPortableCompiledCode will be the portable-to-quick bridge, which sets up the environment appropriately and then invokes the quick-compiled code.

Overwriting the assembly of a trampoline or bridge can cause serious problems and crashes, as doing so will affect many methods other than the one we intended to hook. Instead of relying on these entrypoints, the support code employs a procedure that directly looks up the code for the method in the executable file. However, recall that the interpreter hooking needs to actually change the entryPointFrom*CompiledCode; if it pointed to a trampoline, changing it may cause the method to be called without first initializing the class. So, before hooking a method, the Java API is used that that forces the class to be initialized. This causes ART to replace some trampolines with direct pointers to the code.

Future-Proofing.

Various techniques may be employed to mitigate the risks associated with running in a different version of ART where assumptions change. Dynamic linking is used so that the support code can check that functions that may be called actually exist. At application start, the support code attempts to swizzle code; if unsuccessful, the support code will shut down the library for this and all future runs of the app to avoid crash risk. Instead of directly accessing fields in structures, the support code figures out at what offset they are stored by comparing them to known values.

Race Conditions.

One place where it's known to have race conditions is in overwriting code. To hook a function, MobileSubstrate overwrites 4 bytes, then overwrites another 4 bytes; if another thread is executing that function during that period, it could crash. To avoid this, special assembly instructions may be employed that can atomically perform a 64-bit write (e.g.: those used by OSAtomicCompareAndSwap64 and friends), as well as APIs that allow for a pause in the other Java threads while the support code is hooking.

Garbage Collection Roots.

Java is a garbage-collected language, meaning any unused memory will be automatically freed. A garbage collector basically works as follows: Find all objects immediately accessible by the program, namely all objects that are stored in local variables at the current time of execution. These are called the "roots". Find all objects that the program could possibly access in the future by finding all objects referenced by the roots, then all objects referenced by objects referenced by the roots, etc. These are called the "reachable" objects. Free the memory used by all non-reachable objects.

In order to find the roots, every method comes equipped with two pieces of metadata: The "GC Map." The GC map shows, for various points in the compiled method's machine code, which locations contain pointers to objects. These locations can be either locations in the method's stack frame, or registers. The "spill mask". When one method calls another, the callee will need to use the registers, even though the caller has important data stored in them. It will thus save the previous value of the registers to the stack. The registers that it saves are recorded in the "spill mask."

The garbage collector traverses the stack to find the roots, examining the chain of method callers. When the GC map indicates that a method saved a pointer in a register, it uses the spill masks to find where a different method saved that register to the stack.

When the support code hooks a function, the code runs and saves registers to the stack. The garbage collector will not know this. This results in it looking in the wrong place for the saved registers. It may attempt to treat a garbage value as a pointer (and crash), or it may erroneously consider a reachable-object as non-reachable and free it, resulting in a crash later when that object is accessed.

The runtime has a mechanism for dealing with this. Whenever compiled Java code calls a C++ function, it first invokes a special assembly function called a "callee-save method." That assembly function will save all registers to the stack. It will then mark the stack-frame with a special value indicating to the garbage collector that it has done so. In order to address this, the support could would need to integrate with this mechanism, essentially crafting original assembly code that does this.

JNI-Stub Hijacking.

JNI-stub hijacking is a technique that allows many of the problems mentioned above to be avoided. Consider a native Java function like the following:

public static native String foo(String x, int y);

A Java program that wishes to invoke this function will first load a C++ library containing an implementation for foo. foo is written according to the Java Native Interface (JNI), which is specified in the Java Standard, and hence will not change in a backwards-incompatible way. When it invokes this function, the runtime will find this implementation and invoke it.

To accomplish this, the ART compiler will compile the above declaration into a "JNI stub." The JNI stub will do everything needed to transition from code managed by the ART runtime to "normal" C++ code, including: Save registers and inform the garbage collector it has done so; Writing the location of the current stack-frame in thread local storage; Dynamically look up the C++ function associated with the current ART method; Invoke it according to a standard calling convention.

This stub will be the same for any two native methods that have similar arguments and return-values. At the assembly level, any two objects can be treated the same and hence can be considered similar arguments. Any 32-bit primitive value (e.g.: integers and booleans) can also be treated the same.

Empirically, although the support code swizzles scores of methods, there are currently only 16 distinct argument patterns according to this criterion. The support code ships with one native method declaration and one C++ function for each, forcing the compiler to generate a JNI stub for each argument pattern we care about. When the support code hooks the assembly of a function, instead of having it jump directly to our code, it jumps to the appropriate compiled JNI stub. Note that the JNI stub still takes the ArtMethod being invoked as an argument. The "native function" entry is set on the ArtMethod so that the JNI stub will look up and invoke the C++ function that is provides. Like the code for normal ART methods, the JNI stub will save the ArtMethod being invoked to the stack; the support code must also change the metadata on the ArtMethod so that the garbage collector and stack-trace-mechanism will treat it like the native method for which the JNI stub was generated.

The JNI stub will now invoke the C++ function that has been provided—there is one C++ function for each argument pattern. Because the JNI stub saved the ArtMethod being invoked to the stack, and then saved that stack location to thread-local storage, the support code can look up what method it was invoked from—indeed, the ART runtime even ships with a function for doing so. These C++ functions then dispatch to a centralized "callHandler" in order to invoke the original function and notify Apptimize.

Some of the techniques of the "Many methods, one callback" section above, parsing the shorty to deal with all methods in one place. However, the support code is no longer concerned with the special calling convention, as the JNI stub invokes our C++ functions according to the JNI standard, and these functions in turn pass the arguments to the callHandler in a structured format. The centralized "callHandler" is no longer strictly necessary, as we could instead have each C++ function do this themselves. (Note that, however, there would still be one callback for every method of a single argument pattern—the correct behavior can be performed because the support code can look up what method it is being called for.)

To hook interpreted functions, we set the "entryPointFromInterpreter" to the "artInterpreterToCompiledCodeBridge". We then set the "entryPointFromCompiler" to point to the code of the appropriate JNI stub.

The key benefit of this method is that we are "turning ART against itself." Because we force ART to generate code that bridges from its own environment to a standardized one, we no longer need to worry about the internal structure of ART-generated code, and are fairly impervious to changes in that between versions and devices.

Concerns that arise during swizzle-time, such as dealing with inlined functions, or being sure not to accidentally hook a trampoline function, still apply.

Dealing with De-Dupe.

Earlier, we mentioned that, if two methods compile to the same code, ART may "de-dupe" them and store only one copy of the compiled code. Thus, if we hook one, we hook both.

This poses more problems for JNI-stub hijacking. With the methods described above, when an inadvertently-hooked ART method is called, it will jump to the JNI stub. The JNI stub will look up the C++ function associated with the ART method and jump to it. However, the inadvertently-hooked method is not native and has no associated C++ function, and hence the JNI stub will segfault.

There are several solutions to this problem. One solution is to, at runtime, iterate through all ArtMethod's and identify the ones that share code. When the support code hooks one function, it can hook all clones as well. Note that hooking a function involves marking it as native and associating a C++ function, solving the crash. Because a method is most likely to have the same code as another method in the same class, we can restrict this search to other ArtMethod's of the class containing the hooked method. Because ART can only de-dupe methods compiled at the same time, and most of the methods that are hooked are in the system library, they can only be de-duped with other methods in the system library. The support code can simply include information about known instances of de-duping.

Another solution is to recover from the segfault. When the JNI stub segfaults, the support code can examine the stack, find the ArtMethod that was called, associate it with a C++ function, and then resume execution.

Still another solution is to run a "trampoline" function before the JNI stub. Instead of modifying assembly code to jump directly to the JNI stub, the support code can modify it to jump to a hand-crafted assembly "trampoline" function. This trampoline examines the ArtMethod; if it's a hooked method, it continues into the JNI stub; else, it calls the original method.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. An apparatus comprising:
one or more non-transitory computer readable storage media; and
program instructions stored on the one or more computer readable storage media, wherein the program instructions comprise a callback function that, when executed by a processing system in an application runtime environment, direct the processing system to at least:
identify an original function modified post-compilation to hook into a Java Native Interface (JNI) stub that calls into the callback function;
store an identity of the original function and identify a path for returning to the original function based on the identity of the original function;
identify a target function to run in-place of the original function and call into the target function; and
upon the target function completing, return to the original function, wherein the return is made such that the original function, and a program, routine, or application that it is a part of, continues to run normally.

2. The apparatus of claim 1 further comprising the processing system operatively coupled to the one or more computer readable storage media, wherein the processing system reads and executes the program instructions.

3. A method comprising:
modifying machine code representative of multiple original functions to hook into a Java Native Interface (JNI) stub that jumps into a single callback function when any of the multiple original functions are invoked;
tracking which original function of the multiple original functions jumped to the callback function when the callback function is called;
storing an identity of the original function that jumped to the callback function and identifying a path back to the original function based on the identity of the original function;
identifying which target function of multiple target functions to call into in response to the original function jumping to the callback function and calling the target function; and
when the target function returns to the callback function, return to the original function via the path, wherein the return is made such that the original function, and a program, routine, or application that it is a part of, continues to run normally.

4. An apparatus comprising:
one or more non-transitory computer readable storage media;
a processing system operatively coupled with the one or more computer readable storage media; and
program instructions stored on the one or more computer readable storage media that, when executed by the processing system, direct the processing system to at least:
modify machine code representative of multiple original functions to jump into trampoline functions when the multiple original functions are invoked;
when an original function of the multiple original functions is invoked, jump into a trampoline function to determine if the original function hooks into a Java Native Interface (JNI) stub that jumps into a callback function;
when the original function hooks into the JNI stub, store an identity of the original function that is invoked, identify a path for returning to the original function based on the identity of the original function, and execute a call dispatch function associated with the JNI stub to dispatch to a callback function with associated arguments/parameters;
identify a target function to execute in-place of the original function and call into the target function; and
upon the target function completing, return to the original function, wherein the return is made such that the original function, and a program, routine, or application that it is a part of, continues to run normally.

5. The apparatus of claim 1, wherein the application runtime environment comprises Android Runtime (ART).

6. The apparatus of claim 1, wherein the identity of the original function comprises one or more of a function name or one or more variables, arguments, or parameters associated with the function.

7. The apparatus of claim 1, wherein the target function comprises a copy of the original function prior to modifications to hook into the JNI stub.

8. The apparatus of claim 1, wherein the original function is modified post-compilation to hook into the JNI stub by, in part, marking the original function as native.

9. The method of claim 3, wherein the identity of the original function comprises one or more of a function name or one or more variables, arguments, or parameters associated with the function.

10. The method of claim 3, wherein the target function comprises a copy of the original function prior to modifications to hook into the JNI stub.

11. The method of claim 3, wherein the original function is modified post-compilation to hook into the JNI stub by, in part, marking the original function as native.

12. The apparatus of claim 4, wherein the dispatch function comprises a C++ function that corresponds to an argument pattern associated with the original function.

13. The apparatus of claim 4, wherein the program instructions are executed by the processing system in an application runtime environment.

14. The apparatus of claim 13, wherein the application runtime environment comprises Android Runtime (ART).

15. The apparatus of claim 4, wherein the identity of the original function comprises one or more of a function name or one or more variables, arguments, or parameters associated with the function.

16. The apparatus of claim 4, wherein the target function comprises a copy of the original function prior to modifications to hook into the JNI stub.

17. The apparatus of claim 4, wherein the original functions are modified post-compilation to hook into the JNI stub by, in part, marking the original functions as native.

* * * * *